US006487003B1

(12) United States Patent
Suzuki et al.

(10) Patent No.: US 6,487,003 B1
(45) Date of Patent: Nov. 26, 2002

(54) OPTICAL INTERACTION DEVICE

(75) Inventors: Yasuo Suzuki, 2-4, Aza Shirane, Shirakata, Tokai-mura, Naka-gun Ibaraki-ken (JP), 319-1106; Takashi Ikehata, Hitachi (JP)

(73) Assignees: Tokyo Denshi Kabushiki Kaisha, Tokyo (JP); Yasuo Suzuki, Tokai-mura (JP)

( * ) Notice: Subject to any disclaimer, the term of this patent is extended or adjusted under 35 U.S.C. 154(b) by 0 days.

(21) Appl. No.: 09/581,525

(22) PCT Filed: Nov. 10, 1999

(86) PCT No.: PCT/JP99/06262

§ 371 (c)(1), (2), (4) Date: Jul. 6, 2000

(87) PCT Pub. No.: WO00/28631

PCT Pub. Date: May 18, 2000

(30) Foreign Application Priority Data

Nov. 10, 1998 (DE) .......................................... 10-319059
Feb. 26, 1999 (JP) .......................................... 11-49847

(51) Int. Cl.[7] ............................ G02F 1/35; H01S 3/081

(52) U.S. Cl. ........................... 359/326; 372/92; 372/99; 372/107

(58) Field of Search ................................ 359/326–332; 372/92–95, 97, 98, 99, 107, 108, 109

(56) References Cited

U.S. PATENT DOCUMENTS 4,626,078 A * 12/1986 Chernin et al. ............. 359/365
5,300,955 A * 4/1994 Kelley ..................... 346/150.2

FOREIGN PATENT DOCUMENTS

| | | | |
|---|---|---|---|
| DE | 3515679 C1 | * | 9/1986 |
| JP | 61097020 A | | 5/1986 |
| JP | 61097021 A | | 5/1986 |
| JP | 01102985 A | | 4/1989 |
| JP | 02049483 A | | 2/1990 |
| JP | 4-137079 | | 12/1992 |
| JP | 05110166 A | | 4/1993 |
| JP | 05251798 A | | 9/1993 |
| JP | 06090066 A | | 3/1994 |
| JP | 06244481 A | | 9/1994 |
| JP | 07249499 A | | 9/1995 |

* cited by examiner

*Primary Examiner*—John D. Lee
(74) *Attorney, Agent, or Firm*—Jacobson Holman PLLC

(57) ABSTRACT

A laser beam is subjected to repeated reflection by a plurality of concave mirrors disposed in a confronting arrangement. Reflecting paths are centralized to form an interactive region of a high photon density. An interaction target such as gas, liquid, a solid body, plasma, a particle beam and an electron beam is introduced into the interactive region. Interaction with the laser beam causes optical interactions such as optical excitement, optical ionization, optical dissociation, optical synthesis, optical generation and optical analysis.

17 Claims, 8 Drawing Sheets

(a)

OPTICAL INTERACTION DEVICE

TECHNICAL FIELD

The present invention relates to a device on which a laser beam is reflected multiple times by a plurality of confronting concave mirrors, the reflected optical path is centralized to form an interactive region of high photon density, and an interaction target such as gas, liquid, a solid body, plasma, a particle beam or an electron beam is introduced into the interactive region to cause an optical interaction such as optical excitation, optical ionization, photolysis, optical dissociation, photosynthesis, optical generation and optical analysis.

TECHNICAL BACKGROUND

Gas, liquid, solid bodies and particle beams perform strong optical interactions with laser beams of specified wavelengths corresponding to the atoms and molecules composing them. In order to cause such interactions in the conventional arts, a pair of confronting curvilinear mirrors are generally used for forming an optical resonator in which optical interactions are carried out.

In this case, a region of high photon density is centralized to the center of the resonator interior. Such a region is extremely too small and too short to reserve long interaction time of atoms and molecules passing through the region. In order to reserve sufficient possibility to store light, an aperture formed through each curvilinear mirror is designed as small as possible to reduce optical loss. As a result, introduction of beams, atoms and molecules into the interactive region is rendered to be highly difficult to practice sufficiently. It is additionally a recent trend to use laser beams of extremely short pulses. Use of such laser beams makes the interactive region extremely small in terms of time and space dimension and, consequently, it is almost infeasible to cause optical interactions effectively.

Use of gas flows and particle beams for optical interaction necessitates presence of large apertures for incidence and exit into and out of the interactive region. In addition, these interaction media are in most cases rather low in density and degree of interaction. In order to cause sufficient optical interactions of the gas flows and particle beams with the laser beam, it is necessary to reserve a large interaction region in terms of time and space dimension.

SUMMARY OF THE INVENTION

It is thus the primary object of the present invention to provide a novel optical interaction device which removes the above-described problems inherent to the conventional arts and assures high efficiency in use of laser beams.

It is another object of the present invention to provide an optical interaction device which is able to reserve large apertures for incidence and exit of interaction media and interaction targets, a large interactive region with high photon density and along interaction time.

According to the present invention, an optical interaction device includes a pair of confronting first and second mirror sets each of which is made up of a plurality concave mirrors disposed in a annular arrangement around a common axis of the interactive region.

A laser beam generated by laser beam generating means is led to one concave mirror selected from the first mirror set via a laser beam guide means. Each concave mirror in the first mirror set reflects an incident beam to pass it through a prescribed position on an axis of the interactive region to direct a reflected beam to a corresponding concave mirror in the second mirror set. As a result, an interactive region of high photon density is formed at a position where reflected beams are centralized.

Each concave mirror in the second mirror set reflects incident beam from a corresponding concave mirror in the first mirror set to direct it to an adjacent concave mirror. As a consequence, each laser beam reciprocates between the first and second mirror sets whilst sequentially moving in the circumferential direction of the first and second mirror sets.

Interaction between the laser beams and the interaction target takes places in an interaction region where the laser beams pass collectively.

On the optical interaction device in accordance with the present invention, incident laser beams to the concave mirrors of the first, mirror set are reflected in a collected fashion and centralized at a focus on an axis of the interactive region. Then, each reflected beam can be directed to a corresponding concave mirror of the second mirror set. Thus, a interaction region of high photon density can be formed at a position where the reflected beams are centralized.

DESCRIPTION OF THE PREFERRED EMBODIMENTS

Figure 1:
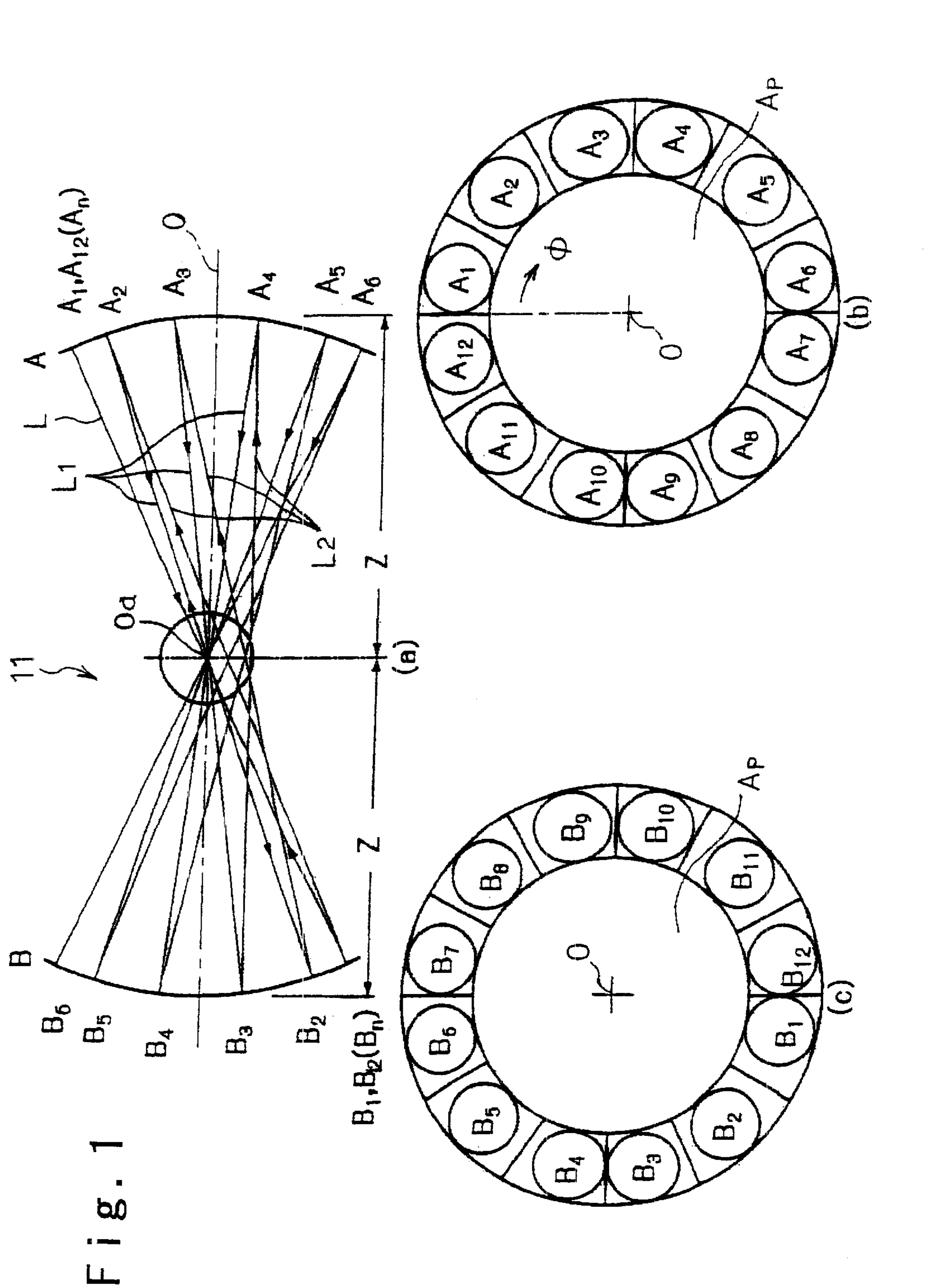
FIG. 1 shows the diagrammatic view of the optical interaction device in accordance with the present invention, in which (a) is a side plan view, and, (b) and (c) are front plan view of respective mirror sets, FIG. 2 indicates laser beam optical paths of laser beams reciprocating the mirrors sets, in which (a) shows the going optical path and (b) shows the return optical path.
Figure 2:
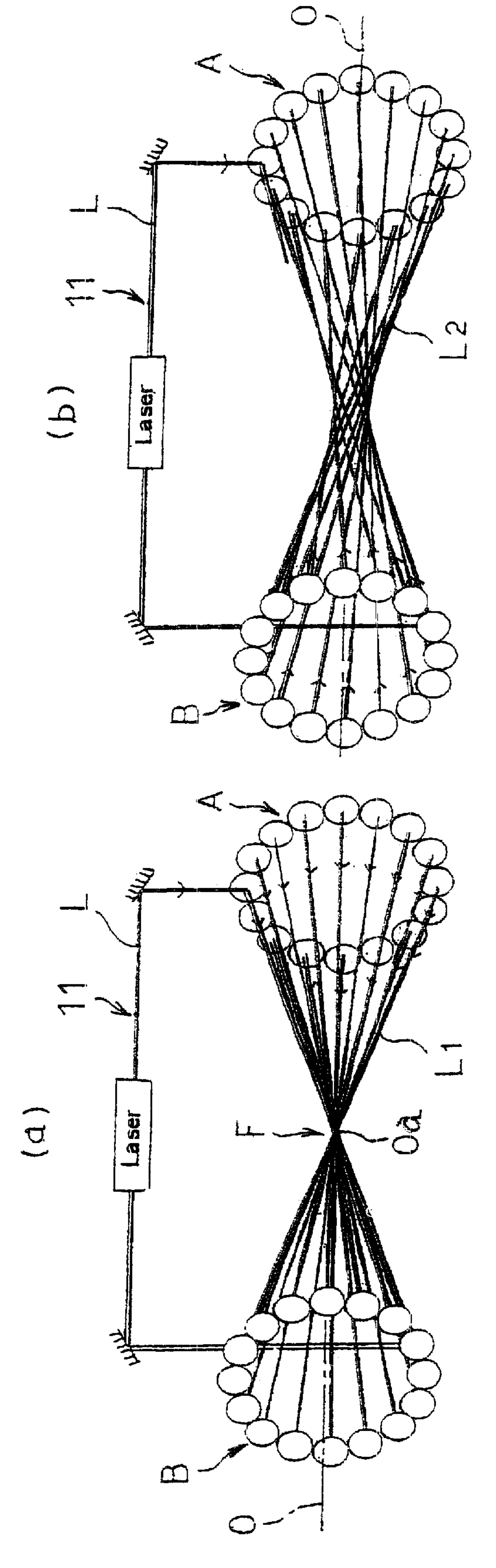

Various embodiments of the present invention shall be hereinafter described in reference to the accompanying drawings, in which FIG. 1 shows a diagrammatic view of the optical interaction device in accordance with the present invention. In FIG. 1, (a) is a side plan view and (b) as well as (c) are front plan view of the respective mirror sets. The optical paths of laser beams reciprocating between the mirror sets A and B are shown in FIG. 2.

The optical interaction device 11 includes a pair of mirror sets A and B disposed in a confronting arrangement. The mirror set A includes multiple concave mirrors A1, A2 to An which are disposed annularly around an axis of the interactive region O of beams. Similarly, the mirror set B includes multiple concave mirrors B1, B2 to Bn which are disposed annularly around an axis of the interactive region O of beams.

In the case of the illustrated embodiment, each mirror set A or B includes twelve concave mirrors (n=12). An aperture Ap is formed on the inner side of each annular arrangement of the concave mirrors for introduction of electron beams. Although the mirrors of the mirror sets A and B appear to be disposed on curved planes in the illustration in order to show that the concave mirrors have a same focal length, the concave mirrors are disposed on flat planes in practice.

Each concave mirror An of the mirror set A reflects an incident laser beam to focus the same at a prescribed position on the axis of the interactive region O and the reflected laser beam is directed to a corresponding concave mirror Bn of the mirror set B. Here, the optical path L1 of the laser beam traveling from the concave mirror An to the concave mirror Bn whilst passing the focus is hereinafter referred to as “a forward trajectory”.

Each concave mirror Bn of the mirror set B reflects an incident laser beam from a corresponding concave mirror An of the mirror set A to direct the same to an adjacent concave mirror An+1, the adjacent concave mirror being biased from the concave mirror in the direction of Φ. Here, the optical path L2 of the laser beam traveling from the concave mirror Bn to the concave mirror Bn+1 is hereinafter referred to as “a return trajectory”.

Therefore, the laser beams introduced to the mirror sets A and B sequentially shift their reflected beams in the circumferential direction Φ of the annular arrangement of the concave mirrors. Stated otherwise, the beams travel from A1 to B1, from B1 to A2, from A2 to B2 - - - from An to Bn and from Bn to An+1, respectively. In FIG. 1, only the optical paths of reciprocating laser beams from A1 to A6 are shown for simplification purposes.

The inter-mirror distance of the forward trajectory L1 from a concave mirror An to a corresponding concave mirror is set to 2Z and the radius of curvature of the concave mirror are set to 2Z. When a laser beam is incident in a parallel mode to the concave mirror A1 from the position of the concave mirror B1 via, for example, a telescope in the arrangement shown in FIG. 1, the laser beam reflected from the concave mirror A1 focuses at a point Oa on the axis of the interactive region and, thereafter reaches at the concave mirror B1 in a diverged mode. Since the concave mirrors A1 and B1 have a same focal length, the laser beam L2 reflected by the concave mirror B1 travels to the concave mirror A2 in a parallel mode. The laser beam reflected by the concave mirror A2 focuses at the point Oa. This process is sequentially repeated. In this process, the laser beams L1 in the forward trajectory all focus at the point Oa and the laser beams L2 in the return trajectory all travel in a parallel mode.

When a laser beam is incident to the concave mirror A1 in a converged mode, the reflected laser beam travels in a parallel mode. So, all laser beams L1 reflected by the concave mirrors A travel, after passing the point Oa on the axis of the interactive region, in a parallel mode towards the concave mirrors B. Upon reflection by the concave mirrors B, the laser beams travel in a converged mode towards the concave mirrors A. Sequential reflections are repeated all in this mode. During this process, the laser beams in a parallel mode are all centralized at the point Oa to form an interaction region of a high photon density around the point Oa. The reflected laser beams L2 in the return trajectory are also collected within an narrow region around the point Oa. So, the laser beams L2 in the return trajectory may also be utilized for the optical interaction.

When a laser beam is incident from the position of B12 whereat no concave mirror is provided, the laser beam exits from the position of B12 after travel between the mirror sets A and B. Consequently, it is possible to introduce a laser beam into the system by an outside optical circuit including an optical switch to rotate the polarization plane over 90 degrees, reflect it several times for repeated incidences, thereby storing laser beams in the region between the mirror sets A and B. Laser beams can be introduced into the system constantly when wavelength is change by a secondary harmonics generator. The manner and incident and exit positions of laser beams are not limited to the above-described designs.

When a beam is incident to a concave mirror with inclination to its optical axis, the resultant image is distorted due to aberration. Distortion can, however, be offset at every 180 degree of rotation by reflecting the beam whilst rotating the concave mirror in the direction of Φ. As a result, reflection can be repeated over a long distance. The number of reciprocation of a laser beam between the mirror sets A and B dependent upon the reflection loss of the mirrors involved in the process. Even taking into consideration the fact that the photon density lowers to 0.999 times after the first reflection and to $0.999^2$ times after the second reflection, a 1000 times of photon density can be obtained as a whole at the point where the beams cross. This is because 1 divided by (1–0.999) is equal to 1000.

Therefore, when an interaction target such as gas, liquid, a solid body, plasma, particle beams and electron beams are introduce along the axis into the region between the mirror sets A and B, laser beams and the interaction target perform a desired interaction within the interactive region near the point Oa whereat the laser beams focus.

Laser beam pulses shored at the above-described optical interaction device are classified into the following three types.

(1) Storage of a single short pulse. Only one high output pulse shorter than the inter-mirror distance is introduced into the system so that a pulse train should repeatedly interact with electron beams. The period of pulse is as long as the time for travel between mirrors.

(2) Storage of multiple short pulses. A plurality of pulses, each of which has a period of pulse as long as the time for travel between mirrors, are introduced into the system for storage within a region between mirror sets.

(3) Storage of a long pulse. A pulse longer than the inter-mirror distance is used so that a laser beam should always be present between mirror sets.

When laser beams are introduced into the system in either of the three modes, the laser beams are collected at the center of the region between the mirror sets, whereat optical paths cross, to enhance photon density.

When particle beams of a velocity V are introduced into the interactive region F, the optical energy density is increased to $\gamma\,(1-\beta\cdot\cos\,\theta)$ times due to Einsteinian Lorentz transformation whereas the wavelength is reduced to $1/\gamma(1-\beta\cdot\cos\,\theta)$ times due to Doppler effect. Here, β is equal to V/C, γ is epual to $(1-\beta^2)^{-1/2}$, and θ is the cross angle between a flux of laser beams and particle beams. Through tactful choice of the particle beam velocity and the cross angel, effective laser output can be enhanced and expedient selection and adjustment of laser beam wavelength can be achieved.

[For Optical Interaction of Gaseous Atoms or Molecules ]

Figure 3:
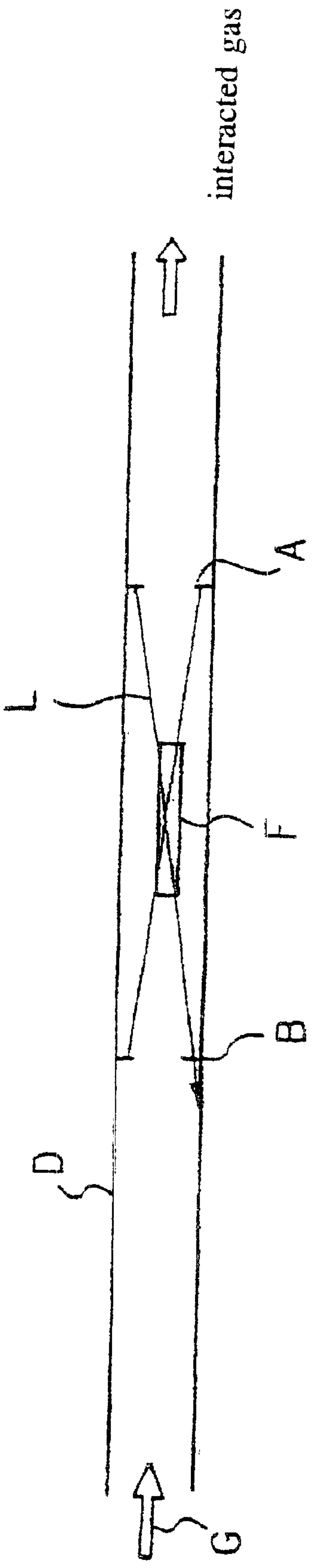
FIG. 3 shows the optical interaction of as with laser beams on the optical interaction device in accordance with the present invention.

As shown in FIG. 3, gas G is passed, as an interaction target, through the interactive region F in the optical interaction device in accordance with the present invention to cause optical interactions such as optical excitation with laser beams L.

For example, laser beams of a proper wavelength are selected and an interactive region F is formed in a duct and gas G such as dioxin gas or NoX gas is introduced into the interactive region F to cause efficient optical dissociation of the interaction target. When oxygen gas G is introduced, ozone can be synthesized optically. Namely, through optical interaction of gaseous atoms or molecules with laser beams within the interactive region, optical photolysis, optical synthesis, optical analysis and other optical treatments can be performed.

[For Generation of Laser Beams with Wavelength Conversion by Interaction with Liquid or a Solid Body ]

Figure 4:
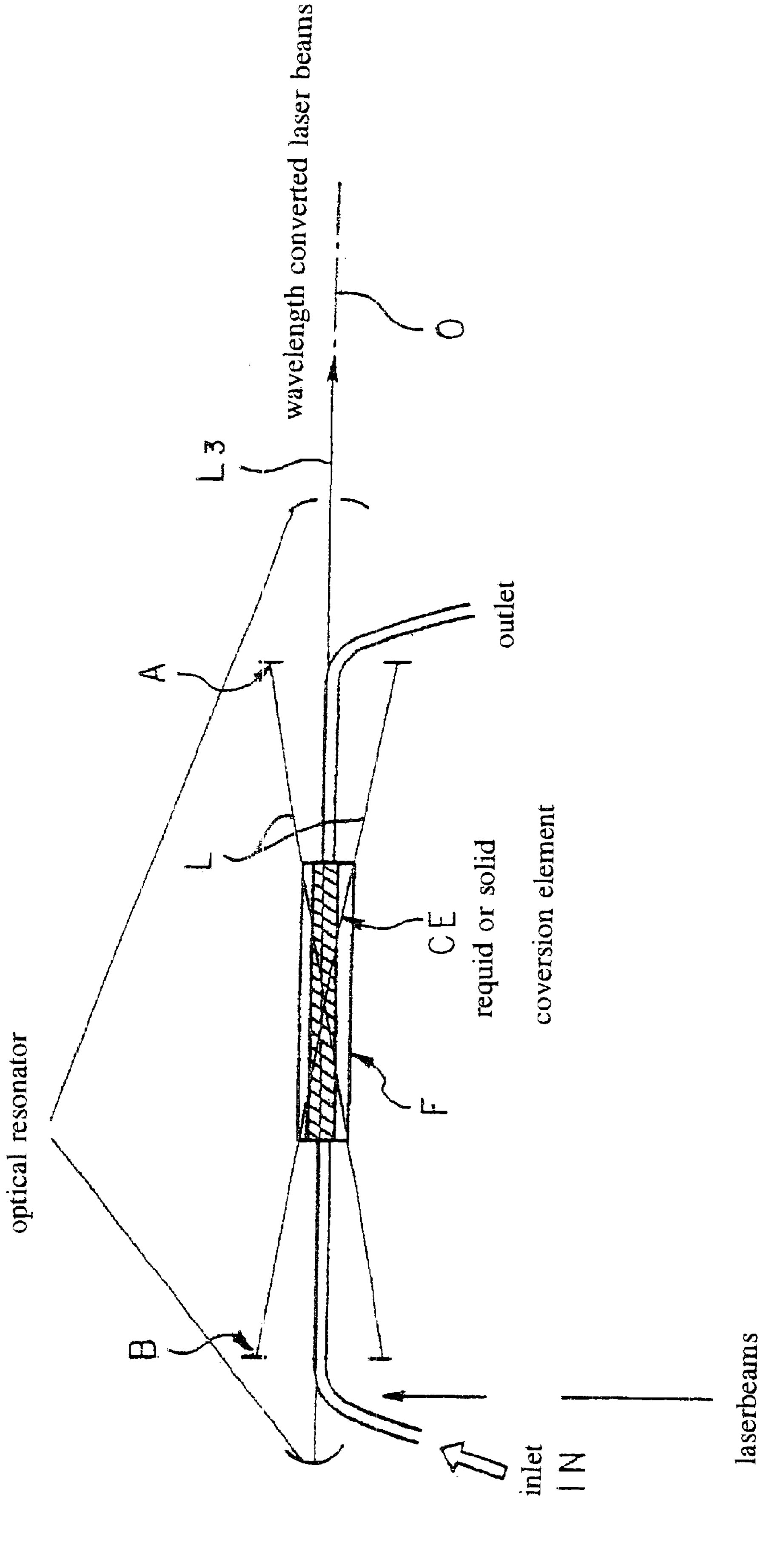
FIG. 4 shows a process for producing a laser beam with wavelength conversion by the optical interaction device in accordance with the present invention.

As shown in FIG. 4, a liquid or solid conversion element CE is placed as an interaction target in an interactive region F. Optical excitation is caused by use of proper laser beams and laser beams of a specified wavelength are oscillated by an optical resonator RE arranged on the axis O of the interactive region. The liquid or solid conversion element CE is introduced through an inlet IN and placed in the interactive region F for excitation by laser beams L, thereby generating laser beams with wavelength conversion. An wavelength converted laser beam L3 is stored at an optical resonator RE for intended use.

[For Charge Conversion of Particle Beams]

Figure 5:
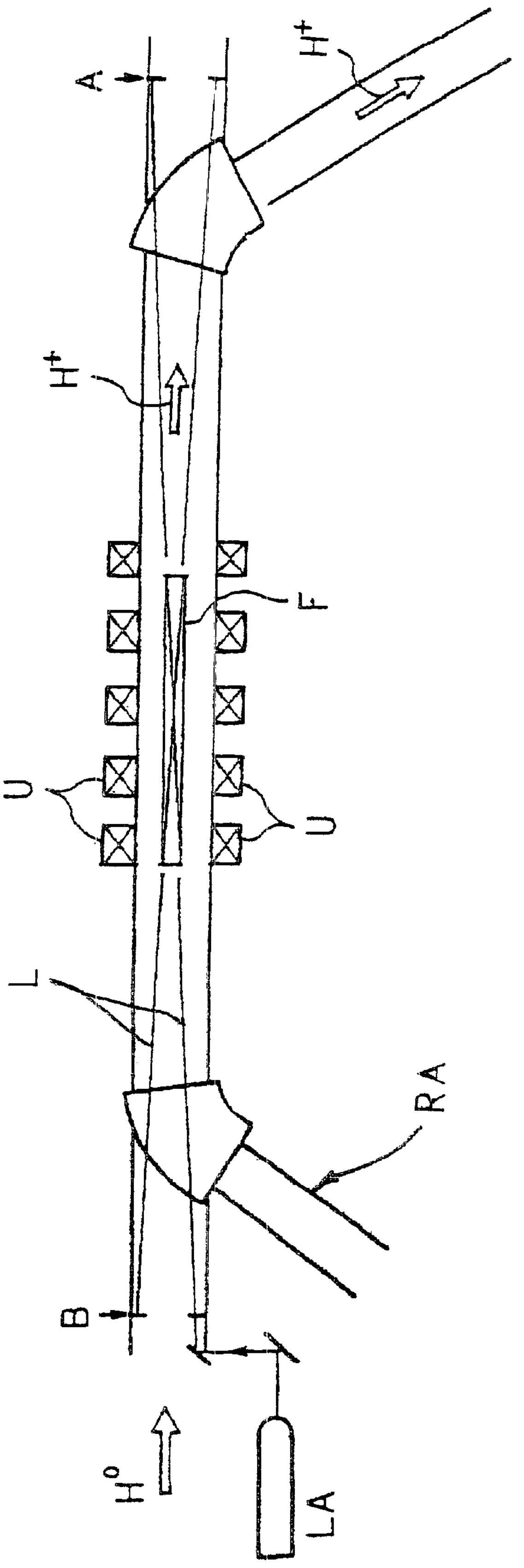
FIG. 5 shows a charge converter incorporating the optical interaction device in accordance with the present invention.

As shown in FIG. 5, laser beams L generated by a laser beam generator LA are introduced into a space between mirror sets A and B to form an interactive region F. When a high energy hydrogen beam $H^0$ is introduced as an interaction target into the interactive region F, the beam is excited efficiently through optical interaction with the laser beams L.

An excited hydrogen beam is ionized within a magnetic field generated by charge converting magnets U which are arranged embracing the interactive region F for charge conversion. Ionized hydrogen ion $H^+$ is subjected for reciprocation between the mirror sets A and B via a ring accelerator RA. In this case, the interactive region F is utilized for charge conversion of the ring accelerator RA.

[For use as a multivalent ion source]

Figure 6:
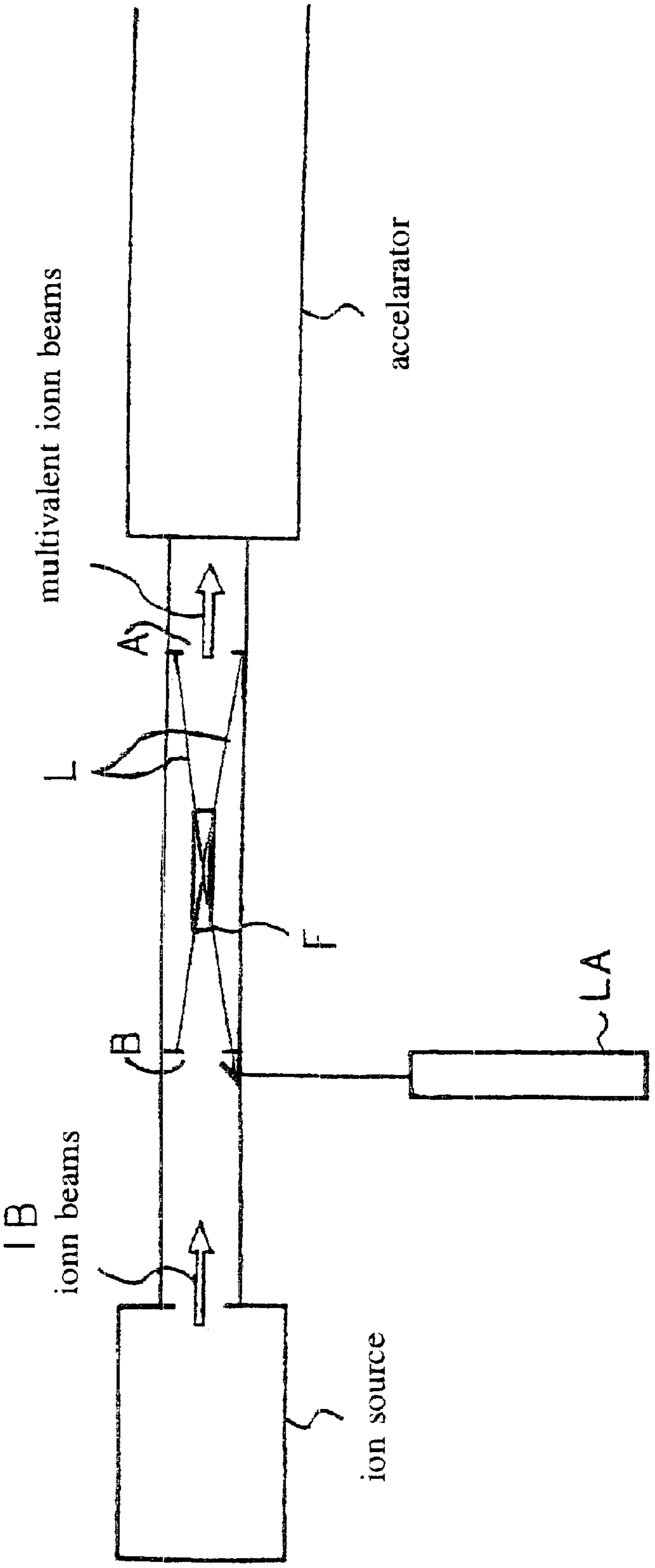
FIG. 6 shows a multi charged ion source incorporating the optical interaction device in accordance with the present invention.

As shown in FIG. 6, an ion beam IB from an ion source is introduced into an interactive region F. Lots of electrons are stripped off the ion beam through optical ionization to form multivalent ion with high charge. More specifically, laser beams L generated at a laser generator LA are introduced into a space between mirror sets A and B to form an interactive region F. An ion beam IB from the ion source is introduced into the interactive region F in which the ion beam is excited to increase charge and generate a multivalent ion beam.

The multivalent ion beam is accelerated at an accelerator. In an example, a monovalent oxygen ion beam from the ion source is introduced into the interactive region F to generate a octavalent ion beam which is accelerated at the accelerator to an energy of eight times higher.

[For Use as a Micro Analyzer]

Figure 7:
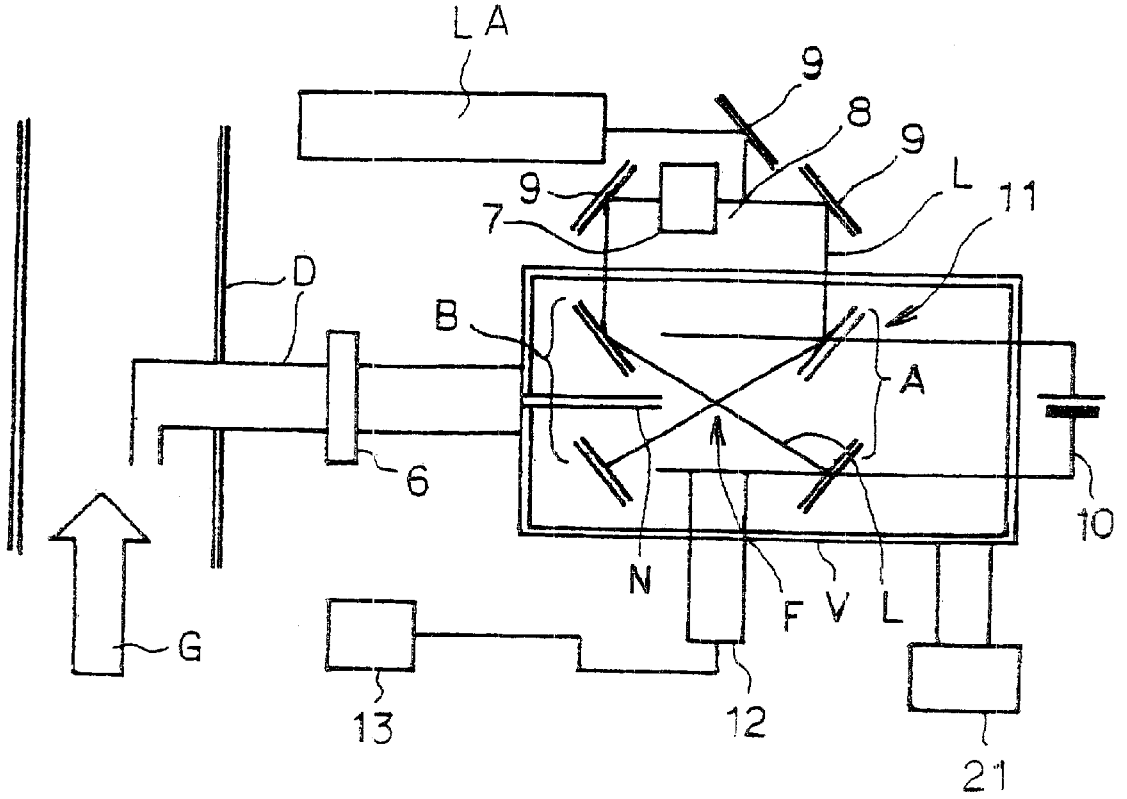
FIG. 7 shows a micro analyzer incorporating the optical interaction device in accordance with the present invention.

When the optical interaction device in accordance with the present invention is used for micro analyzer, a vacuum change V is provided in connection with a duct D for flow of exhaust gas G as shown in FIG. 7. The vacuum chamber V is associated with a vacuum pump 21 for evacuation thereof. The duct D is provided with a compressor 6 for provisional compression of the exhaust gas G. The exhaust gas G is passed to a nozzle N via a shutter valve of the compressor 6 for ejection into the vacuum chamber V. This ejection causes inflation and cooling of the exhaust gas G. The nozzle N is disposed with its mouth being directed to the interactive region F.

The optical interaction device 11 performs resonance ionization of micro-components such as dioxin within the exhaust gas G. Laser beams L are supplied into the optical interaction device 11 from a given source outside the vacuum chamber V. A laser beam generator LA, an optical switch 7, a polariscope 8 and reflection mirrors 9 are disposed outside the vacuum chamber V for selection of laser beams of a specified wavelength in accordance with the kind of the micro-component such as dioxin and for supply into the optical interaction device 11.

Laser beams of a specified wavelength is capable of ionizing a specified substance through resonance. For example, a long pulse system is applied to ionization of dioxin. When high output laser beams of about two nanometer wavelength are used, only electrons can be stripped off the dioxin for ionization without causing any decomposition of dioxin molecules.

The vacuum chamber V is provided with a collection guide 10 for electric absorption of ions. The collection guide 10 captures ionized dioxin by its electric charge. The dioxin so captured by the collection guide 10 is passed to an analyzer 12 of travel time and mass. The resultant mass spectrum is visually indicated on a monitor 13. Quantitative and qualitative analysis of dioxin can be carried out on the basis of the resultant mass spectrum.

[For Removal of Harmful Micro-component]

Figure 8:
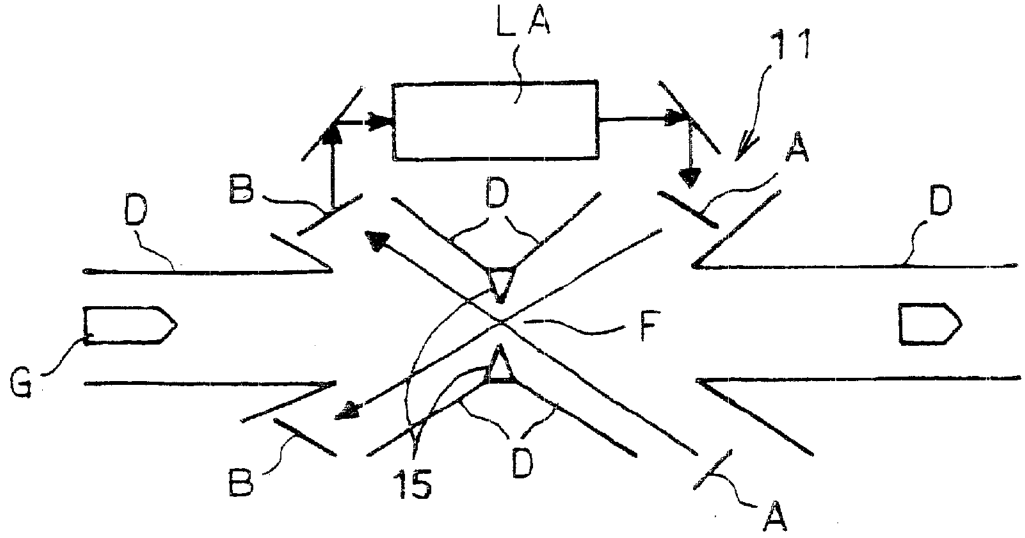
FIG. 8 shows a micro analyzer incorporating the optical interaction device in accordance with the present invention.

As shown in FIG. 8, the optical interaction device in accordance with the present invention is disposed in a duct for exhaust gas G and a throttle 15 is disposed therein in order to ionize dioxin by a short pulse process. In this case, no compression of the exhaust gas is employed since only decomposition and harmlessness of the dioxin are intended without any need for high degree sensitivity. Therefore, interaction is carried out under atmospheric conditions.

[For Use as an X-ray Beam Generator]

Figure 9:
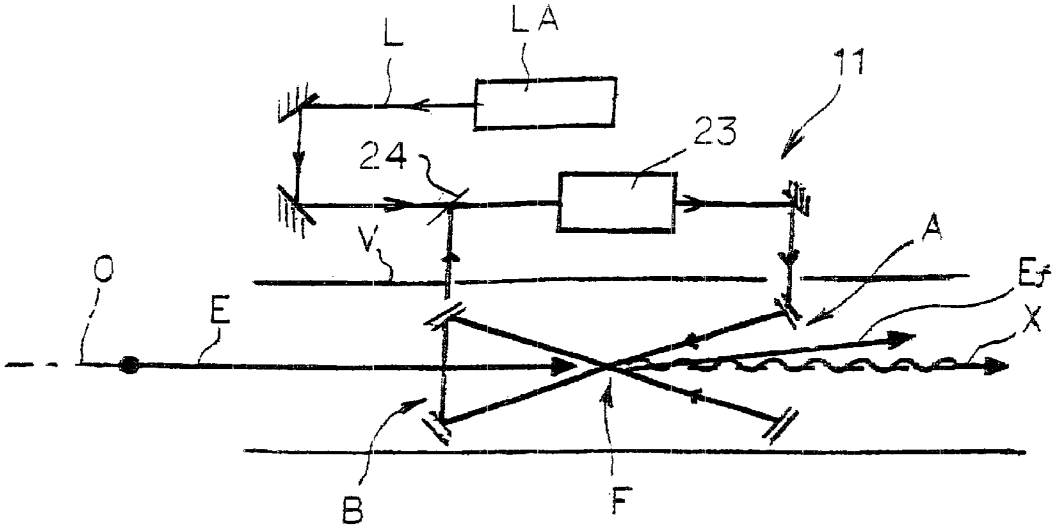
FIG. 9 shows a micro dissociation device incorporating the optical interaction device in accordance with the present invention.

In the arrangement shown in FIG. 9, the optical interaction device in accordance with the present invention is used for generation of an X-ray beam. In the illustration, 11 indicates the optical interaction device, LA indicates a laser beam generator, 23 indicates a SHG (secondary harmonics generator), 24 indicates a dichroic mirror and A and B indicate mirror sets which are disposed within a vacuum chamber V.

A laser beam L of a selected wavelength is introduced into the optical interaction device 11 and an interactive region F of a high photon density is formed by centralization of the laser beam L. An electron beam e is introduced into the interactive region f in the vacuum chamber V along the axis O of the interactive region for interaction with the laser beam 1.

It is understood that the laser beam made up of optical particles crashes against the electron beam to generate an X-ray beam through dispersion of photon beam. When a laser beam, i.e. a sufficiently powerful electromagnetic wave, is used as an undulator which periodically applies electromagnetic power, X ray emission is resulted. In the illustration, X indicates an X ray generated by inverse Compton scattering or interaction with the undulator and Ef indicates scattered electron.

[For Two Step Excitation]

Figure 10:
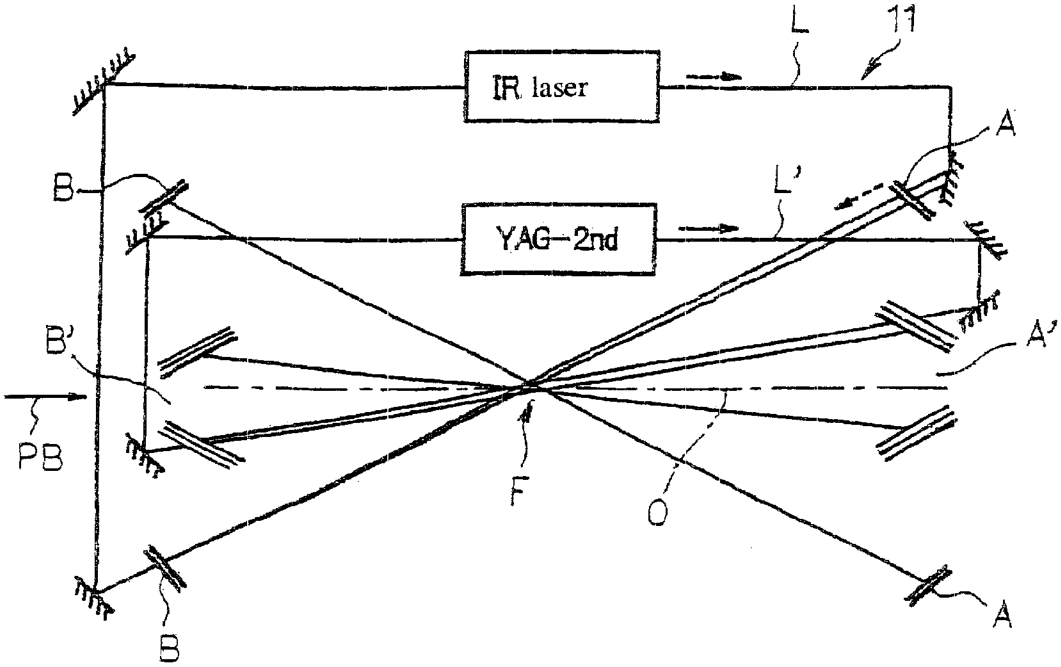
FIG. 10 shows dual phase excitation process performed on the optical interaction device in accordance with the present invention.

As shown in FIG. 10, the interaction device 11 includes two pairs of mirror sets A, B·A' and B' which arranged side by side so as to have a common interactive region F. Laser beams L and L' of different wavelength are introduced into the system. For example, IR laser beam and YAG-2nd laser beam are used. When A particle beam PB is introduced as an interactive target, the first step optical interaction is performed by the YAG-2nd laser beam and the second step optical interaction is performed by the IR laser beam.

POSSIBILITY OF INDUSTRIAL APPLICATION

The present invention can be employed in industrial fields in which optical interactions such as optical excitation, optical ionization, optical photolysis, optical dissociation, photosynthesis, optical generation and optical analysis are performed through interaction of laser beams of a specified wavelength with gaseous atoms and molecules, liquids and solid bodies.

What is claimed is:

1. An optical interaction device comprising:

first and second mirror sets which are arranged in a confronting orientation so as to form an optical interactive region with centralized laser beams, each set including a plurality of concave mirrors oriented in annular arrangement around a common axis, means for generating laser beams for repeated reflection between said mirror sets, laser beam guide means for introducing said laser beams into said interactive region and for outputting therefrom after prescribed number of reciprocal reflections between said first and second mirror sets, and means for introducing an interaction target into said interactive region each said concave mirror in said first mirror set is oriented in an arrangement such that an incident laser beam is reflected towards a corresponding concave mirror in said second mirror set, each said concave mirror in said second mirror set is oriented in an arrangement such that an incident beam from a corresponding concave mirror in said first mirror set is reflected towards a concave mirror adjacent to said corresponding concave mirror, thereby sequentially shifting reflected beams in a circumferential direction of said mirror sets, a laser beam reflected by one of each concave mirror of said first mirror set and said second mirror set is in a converged mode whereas a laser beam reflected by the other of each concave mirror of said first mirror set and said second mirror set is in a parallel mode, said concave mirrors are oriented so that either of said converged mode laser beam and parallel mode laser beam pass a prescribed position on said common axis, and an optical interactive region is formed through centralization of laser beams reflected towards said prescribed position on said common axis.

2. The optical interaction device as claimed in claim 1, wherein a distance between said confronting concave mirrors is set to be equal to the radius of curvature of said each said concave mirror.

3. The optical interaction device as claimed in claim 1, wherein at least two of said first and second mirror sets, said laser beam generating means and said laser beam guide means are arranged to have said optical interactive region at a common position, and laser beams of different wavelengths are introduced into means for storing laser beams, thereby centralizing a plurality of lasers of different wavelengths at said optical interactive region.

4. The optical interaction device as claimed in claim 1, wherein at least two laser beam storing means including said first mirror set, said second mirror set, said laser beam generating means and said laser beam guide means have said interactive region at a common position, and laser beams of different wavelengths are introduced into said laser beam storing means, thereby collecting a plurality of laser beams of different wavelengths at said interactive region.

5. The optical interaction device as claimed in claim 1, wherein said interaction target introduced into said interactive region include particle beams which increase substantial output of said laser beam or perform selection of laser beam wavelengths through interaction with said laser output of said laser beam or performs selection of the wavelength of said laser beams.

6. The optical interaction device as claimed in claim 1, wherein said interaction target introduced into said interactive region includes a wavelength converting element which perform wavelength conversion through interaction with said laser beams.

7. The optical interaction device as claimed in claim 1, wherein said interaction target introduced into said interactive region include particle beams, a charge converting magnet is oriented surrounding said interactive region to generate a magnetic field in said interactive region, and said particle beams excited in said interactive region are ionized in said magnetic field.

8. The optical interaction device as claimed in claim 7, wherein said interactive region is oriented within a ring of a ring accelerator and particles excited in said optical interactive region and ionized in said magnetic field are accelerated by said ring accelerator.

9. The optical interaction device as claimed in claim 1, wherein said interaction target introduced into said optical interactive region includes ion beams which generate multivalent ions through interaction with said laser beams.

10. The optical interaction device as claimed in claim 1, wherein said interaction target introduced into said optical interactive region includes electron beams which generate X-ray beams through interaction with said laser beams.

11. The optical interaction device as claimed in claim 1, wherein said interaction target introduced into said optical interactive region includes gas which causes photolysis through interaction with said laser beams.

12. The optical interaction device as claimed in claim 1, wherein said interactive region is formed within a vacuum chamber and a duct for introducing compressed gas into said vacuum chamber has a mouth directed toward said interactive region.

13. The optical interaction device as claimed in claim 1, wherein said interaction target introduced into said interactive region is gas, said interactive region is formed within a vacuum chamber, a duct is disposed within said vacuum chamber with its mouth directed towards said interactive region, compressed gas is introduced into said interactive region via said duct, an ion collector guide is disposed in said vacuum chamber so as to collect ionized molecules of said gas, and said ion collector guide is electrically connected to a travel time mass analyzer for analysis of said molecules.

14. The optical interaction device as claimed in claim 1, wherein a laser beam reflected by each said concave mirror in said first mirror set is a converged laser beam focussing on said prescribed position on said common axis, and an optical interactive region of high photon density is formed at said prescribed position by centralization of focuses of reflected laser beams.

15. The optical interaction device as claimed in claim 1, wherein a laser beam reflected by each said concave mirror in said first mirror set is a parallel laser beam focussing on said prescribed position on said common axis, and an optical interactive region of high photon density is formed at said prescribed position by centralization of reflected parallel laser beams.

16. The device as claimed in claim 1, wherein a laser beam reflected by each said concave mirror in said second mirror set is a converged laser beam focussing on said prescribed position on said common axis, and an optical interactive region of high photon density is formed at said prescribed position by centralization of focuses of reflected laser beams.

17. The optical interaction device as claimed in claim 1, wherein a laser beam reflected by each said concave mirror in said second mirror set is a parallel laser beam passing through said prescribed position on said common axis, and an optical interactive region of high photon density is formed at said prescribed position by centralization of reflected parallel laser beams.

* * * * *